United States Patent [15] 3,668,559
Williams et al. [45] June 6, 1972

[54] AUDIO TO DIGITAL CONVERTER

[72] Inventors: Richard E. Williams, Reston; Warren L. Holford, Fairfax, both of Va.
[73] Assignee: Scope Incorporated, Reston, Va.

[22] Filed: Nov. 16, 1970
[21] Appl. No.: 89,781

[52] U.S. Cl. ....332/9 R, 179/1 VC, 325/38 B, 325/42, 332/11 D
[51] Int. Cl. ....H03k 13/22
[58] Field of Search ....332/9, 11, 11 D; 325/38 B, 325/42, 141; 179/1 VC

[56] References Cited

UNITED STATES PATENTS

| | | | |
|---|---|---|---|
| 2,803,702 | 8/1957 | Ville et al. | 332/11 D UX |
| 2,862,186 | 11/1958 | Aigrain | 332/11 D |
| 3,506,917 | 4/1970 | Bond | 332/11 D X |
| 3,273,141 | 9/1966 | Hackett | 325/38 B UX |
| 3,516,022 | 6/1970 | Brolin | 332/11 D |
| 3,582,784 | 6/1971 | Gaunt | 332/11 D X |

OTHER PUBLICATIONS

Hellwarth et al. " Push-Pull Feedback Delta Modulator" Dec. 1968 pp. 877–878 IBM Tech. Disclosure Bulletin, Vol. 11, No. 7

*Primary Examiner*—Alfred L. Brody
*Attorney*—John E. Benoit

[57] ABSTRACT

An audio-to-digital converter having a comparator means for comparing an audio input with a feedback signal. The feedback is coupled to the comparator through a feedback control device so that a constant comparison occurs.

2 Claims, 6 Drawing Figures

INVENTOR.
RICHARD E. WILLIAMS
WARREN L. HOLFORD

INVENTOR.
RICHARD E. WILLIAMS
WARREN L. HOLFORD

INVENTOR.
RICHARD E. WILLIAMS
WARREN L. HOLFORD

AUDIO TO DIGITAL CONVERTER

This invention relates generally to an audio-to-digital converter and more specifically to an audio-to-digital converter which constantly compares the audio signal to a feedback signal.

Most digital message transmission systems in use today use a system which employs a type of differential pulse code modulation known as delta-modulation.

The most common form of delta-modulation employs a system whereby the message waveform to be transmitted is sampled at a predetermined rate and positive and negative step signals are applied to integrating circuits at both the transmitter and receiver at the sampling rate. In the delta-modulator of the transmitter, the output of the integrator is compared with the instantaneous amplitude of the message waveform and the result of the comparison is used to determine the polarity of the next step signal. The next step signal is positive, causing the integrator output to rise, if the integrator output is smaller than the message waveform, and is negative, permitting the integrator output to fall, if the integrator output is larger than the message waveform. A binary digit of one kind is transmitted to the receiver each time the step signal is positive in the delta-modulator, and one of the opposite kind is transmitted each time the step signal is negative.

Some of the factors which tend to detract from transmission quality in a delta-modulation system include quantizing noise and overload distortion. Further, delta-modulation systems include high frequency suppression tendencies which are undesirable.

Accordingly, it is an object of this invention to overcome the above discussed disadvantages of a delta-modulation system by providing an audio-to-digital converter which includes a constant feedback which is compared to an audio input.

It is a further object of this invention to provide an audio-to-digital converter which is clock synchronized and provides a word articulation index in excess of ninety percent.

Yet another object of this invention is to provide a speech-to-digital converter which produces a stable or inaudible output during speech silences at a frequency equal to the clock rate divided by two.

A further object of this invention is to provide a speech-to-digital converter which provides a bistable output having a train of one's and zero's and additionally provides a silent condition which is effectively a third stable state.

A still further object of the invention is to provide a speech-to-digital converter wherein the idle or silent condition provides an output comprised of alternating one's and zero's whereby no DC or "thump" component is introduced into the speech.

A still further object of this invention is to provide a simple circuit for a speech-to-digital converter having high audio gain and which can work directly from a low level microphone.

Another object of the invention is to provide a speech-to-digital converter which clips amplitude but does not create background noise takeover.

Yet another object of the invention is to provide a speech-to- digital converter comprising a circuit which is very stable due to implicit DC feedback.

These and other objects of the invention will become apparent from the following description when taken in conjunction with the drawings wherein FIG. 1 is a block diagram illustrating the basic concept of the present invention;

Broadly speaking, the present invention relates to an audio-to-digital converter having a comparator means for comparing an audio input with a feedback signal. A clock means strobes the comparator circuit at a predetermined, fixed rate. The feedback is coupled to the comparator through a feedback control device so that a constant comparison occurs. When there is no audio signal or when the audio signal is not sufficient to overcome the feedback control signal, there is a constant alternating digital output from the comparator of a one zero condition.

Figure 1:
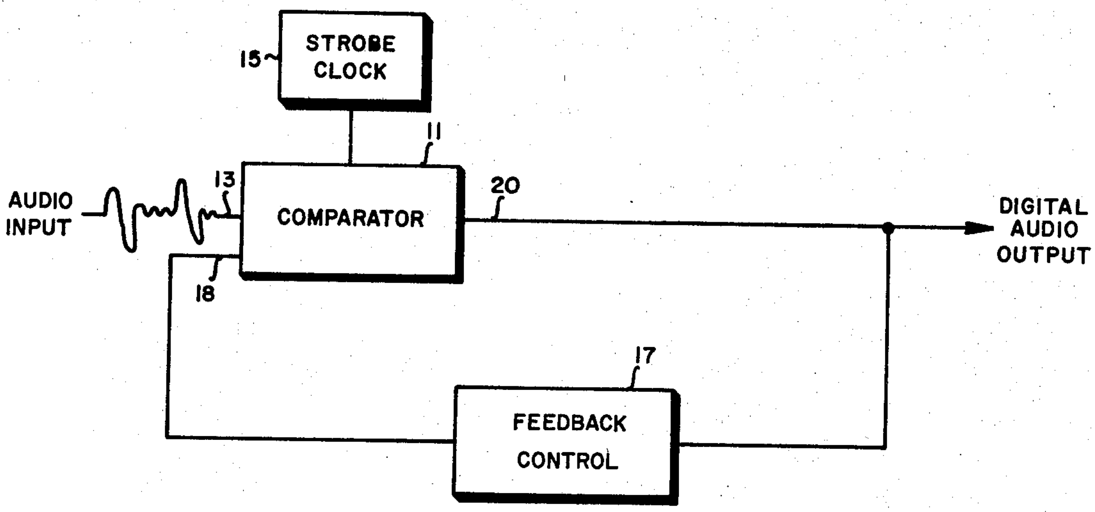

Turning now more specifically to the drawings, there is shown in FIG. 1 an audio input to a non-inverting terminal of a comparator 11 which functions as an amplifier and an infinite clipper; i.e., it yields only "up" and "down" output states at output terminal 20. A stroke clock 15 strobes the comparator 11 at a predetermined fixed rate whereby a digital, infinitely clipped audio output is produced.

The output of the comparator 11 is fed back to the comparator inverting input 18 through a feedback control device 17.

Figure 2:
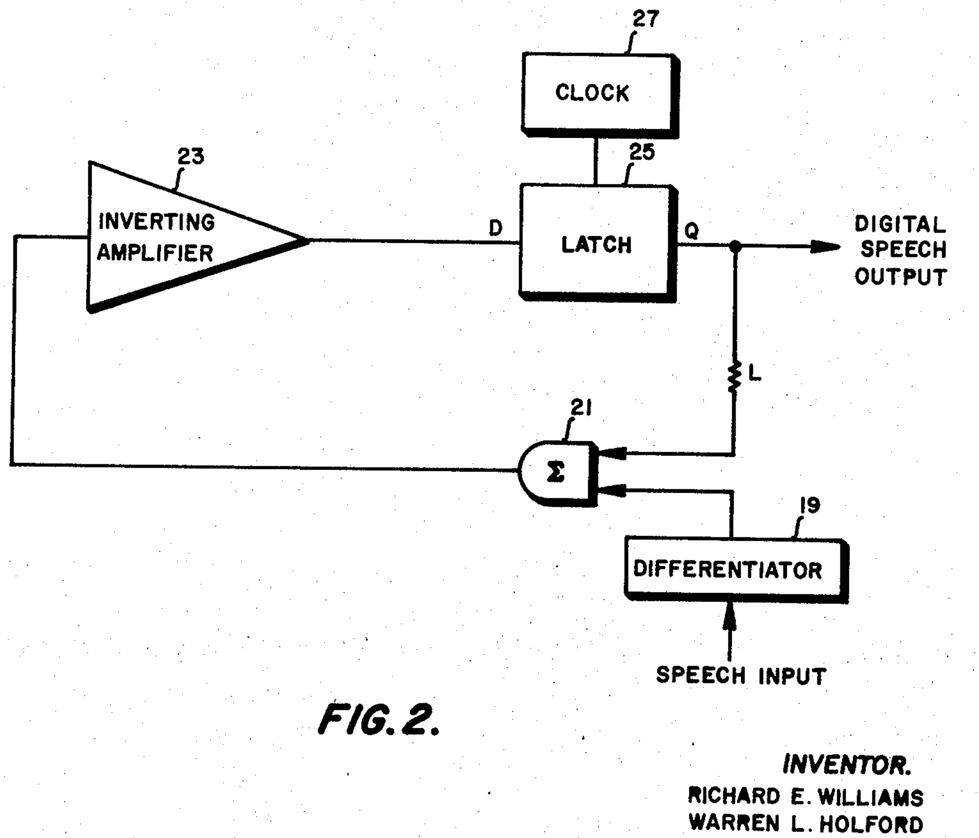
FIG. 2 is a block diagram illustrating a preferred embodiment of the present invention.

FIG. 2 illustrates a preferred embodiment of the basic concept of the invention as shown in FIG. 1. The latch circuit 25 is a standard well-known circuit and is available from a number of manufacturers in integrated circuit form such as the Motorola MC 1813P.

Positive logic wherein a one is positive or high and a zero negative or low will be assumed for descriptive purposes. Accordingly, information present at the data input D to latch circuit 25 is transferred to the Q output thereof when the clock 27 is high or in the sample state, and the Q output will follow the state of the data input as long as the clock remains high. Information present at the Q output will be retained as the clock goes low or in the hold state until such time as the clock is permitted to go high again.

For purposes of explanation, it will be assumed that the latch circuit 25 has no indeterminate state, that is, a high input during the clock strobe will always produce a one out and a low input signal during the strobe will produce a zero out. In such a case the break point is fixed and precise. In the practical case where some indeterminacy is involved, the gain of inverting amplifier 23 of FIG. 2 can be adjusted so as to effectively eliminate such indeterminacy.

Loss element L couples the output of the latch to a summing device 21 so as to provide feedback to inverting amplifier 23. The speech input which may be passed through differentiator 19 is also supplied to the summing device.

Inverting amplifier 23 provides sufficient gain of offset the loss L in the closed loop aroung the latch circuit. Therefore, when no audio input exists, successive clock strobe pulses will cause the latch circuit to complement. A one at the Q output, for instance, will be manifested as a low signal at the D input so that the latch circuit 25, when strobed by the clock 27, will then produce a zero at the Q output and vice versa. Accordingly, in the idle state the output of the latch circuit 25 is comprised of a succession of alternating one's s and zero's whose fundamental frequency is fifty percent of the clock strobe rate.

As an example of the operation of FIG. 2, assume that any input to the latch circuit 25 less than one-half "high" produces a "low" output at Q. If the value of the loss element L and the gain of the inverting amplifier 23 are adjusted so as to Make the loop gain approximately unity, introduction of a small audio signal at the summer 21 will have no effect as long as the audio signal peak to peak excursion is less than that of the pulse amplitudes observed by the summer. In such a case, the pulses from the latch circuit 25 effectively "capture" the loop. The system thus provides an implicit thresholding capability, and background noise during speech silences will not perturb the output. The threshold point is a function of loop gain setting. Advantageously, a high gain inverting amplifier is used and also a high loss L so as to produce high sensitivity of the circuit for audio signals. Reducing both gain and loss simply requires that a higher level audio signal would be needed to operate the circuit.

Figure 3A:
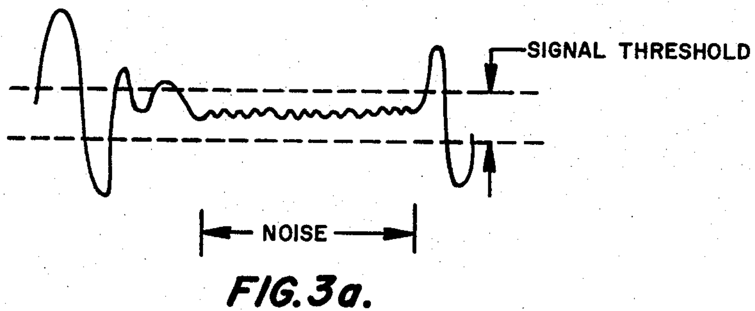
FIG. 3 is a graphic illustration of the operation of the device of FIG. 2.
Figure 3B:
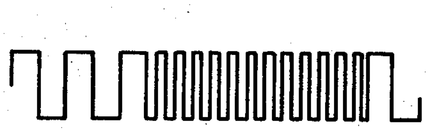
Figure 3C:

If speech enters the system at a sufficient amplitude to "capture" the data input to the latch at D, that is, if it exceeds the latch signal as seen at the summer 21, successive clock strobes will produce outputs from the latch circuit 25 corresponding to one's or zero's depending upon whether the audio signal is "up" or "down" at the moment of the clock strobe. The output pulse train at Q looks like infinitely clipped speech sampled at the clock rate. This is shown specifically in FIG. 3. There is shown an input to the system at FIG. 3a which shows both speech and a section of low level noise during speech silence. The dotted lines indicate the signal threshold imposed by the feedback signal. FIG. 3b shows the output signal Q with the noise illustrated at the clock rate divided by two as discussed above. It is well-known that infinitely clipped speech, especially that preceded by differentiation, provides articulation in excess of ninety percent. The series of output pulses thus contains adequate speech information for general purposes. Since the digital output for silence, as shown in FIG. 3b, is above audio frequencies of interest, when such speech is low pass filtered, the output will be as indicated in FIG. 3c where there is silence between speech sounds.

Figure 4:
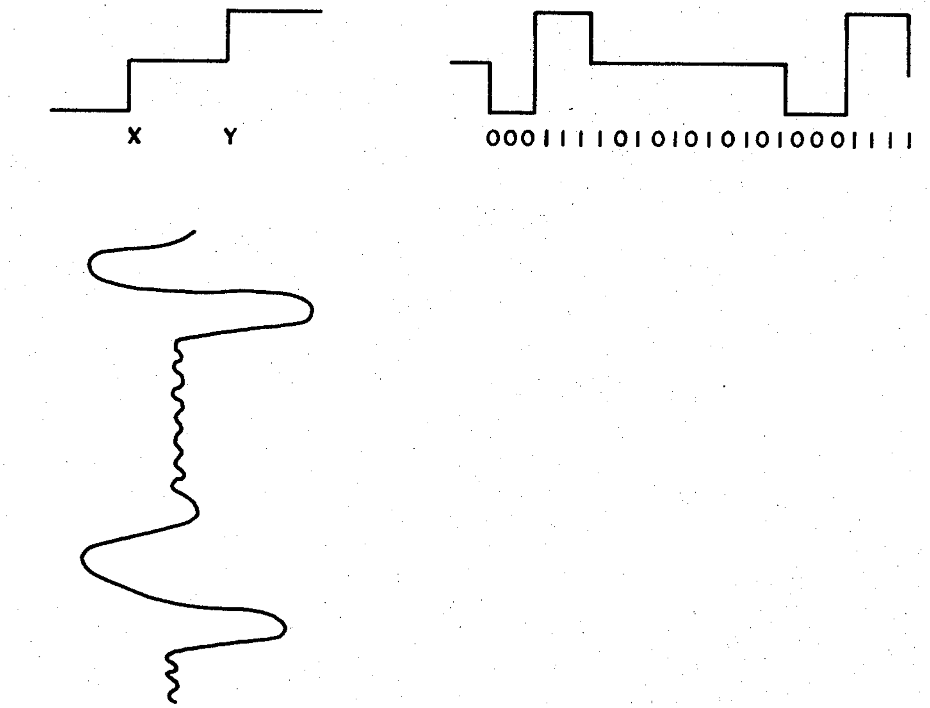
FIG. 4 is a graphic illustration of the transfer function involving the effective third state of the binary output.

Although the output of the circuit is essentially that of a binary one and zero, there is effectively a third audio state for the no speech or silent segments. FIG. 4 illustrates the transfer function of the circuit. Again illustrated is a speech plus noise input wherein the "idle" zone from X to Y is adjustable by means of a loss element L or by means of the gain of the inverting amplifier so as to encompass the anticipated background noise levels. In this region, only the steady state alternating pulses will emanate from the system as indicated by the output of FIG. 4. Whenever the audio input signal exceeds the idle zone, the output will assume one's and zero's in accordance with the polarity of the speech signal.

Since the speech-to-digital conversion system of the present invention has no frequency selective elements other than the fact that the clock strobe is required to take place at a rate consistent with the sampling theorem; that is, at least twice the highest frequency anticipated, the circuit is devoid of the low frequency capture problem typical of delta-modulation systems.

Although it is not absolutely necessary, it is desirable to differentiate frequencies prior to clipping using a high pass network as indicated in FIG. 2 merely to better preserve articulation.

As a practical matter, a summing device of FIG. 2 may be comprised of a resistive network one of whose arms is a loss element and the other a similar loss element in series with the audio input. Such a circuit has performed satisfactorily at clock frequencies ranging from 8 KHZ to over 100 KHZ.

A further advantage of the invention lies in the excellent stability of operation due to the implicit DC feedback. If, for example, the output of the latching network is able to switch for signals having amplitudes measured in millivolts at the input of the inverting amplifier, it is necessary to hold the inverting amplifier input operating point very accurately. If this were not done, the latching circuit could freeze to one of its bistable states. The implicit negative feedback of the circuit assures that a corrective potential will be applied to the input and, with proper choice of bias and feedback resistive values, that the stability will be maintained over large variations in supply voltages, temperature changes and so forth.

The above description and accompanying drawings are illustrative only and the invention is to be limited only by the scope of the following claims.

I claim:

1. A speech-to-digital converter comprising
   summing means,
   means for providing an audio input representative of speech to said summing means,
   latching means,
   inverting amplifier means coupling the output of said summing means to the input of said latching means,
   clock means for strobing said latching means at a predetermined fixed rate, and
   loss means coupling the output of said latching means to the input of said summing means.

2. The converter of claim 1 wherein said amplifier has sufficient gain to offset said loss in the closed loop around said latching means whereby successive clock pulses will cause said latching means to complement when no audio input is present.

* * * * *